US00RE44001E

(19) United States
(12) Reissued Patent
Pedicini et al.

(10) Patent Number: US RE44,001 E
(45) Date of Reissued Patent: Feb. 19, 2013

(54) FASTENER DRIVING APPARATUS

(75) Inventors: Christopher Pedicini, Nashville, TN (US); John Witzigreuter, Canton, GA (US)

(73) Assignee: Tricord Solutions, Inc., Nashville, TN (US)

(21) Appl. No.: 13/021,424

(22) Filed: Feb. 4, 2011

Related U.S. Patent Documents

Reissue of:
(64) Patent No.: 7,793,811
Issued: Sep. 14, 2010
Appl. No.: 12/616,227
Filed: Nov. 11, 2009

U.S. Applications:
(60) Provisional application No. 61/208,556, filed on Feb. 25, 2009.

(51) Int. Cl.
*B25C 1/04* (2006.01)
*B25C 1/06* (2006.01)

(52) U.S. Cl. ..... 227/2; 227/131; 227/130; 60/370

(58) Field of Classification Search ..... 60/370, 60/387; 91/417 A, 417 R
See application file for complete search history.

(56) References Cited

U.S. PATENT DOCUMENTS 1,071,387 A * 8/1913 Behr ..... 173/201
1,319,975 A * 10/1919 Smith ..... 173/78
1,382,821 A * 6/1921 Coates ..... 60/370
1,829,609 A * 10/1931 Robinson ..... 173/201
3,255,674 A 6/1966 Nelson et al.
3,397,828 A * 8/1968 Volkmann ..... 227/130
3,434,393 A * 3/1969 Cairatti ..... 91/417 A
3,568,780 A * 3/1971 Matsuo ..... 173/201
3,580,458 A * 5/1971 Monacelli ..... 227/124
3,602,103 A * 8/1971 Powers ..... 91/443
3,821,992 A * 7/1974 Matsuo ..... 173/200
3,878,902 A * 4/1975 Matsuo ..... 173/14
4,033,419 A * 7/1977 Pennington ..... 173/34
4,344,555 A * 8/1982 Wolfberg ..... 227/130
6,499,643 B1 12/2002 Hewitt
6,755,336 B2 6/2004 Harper et al.
7,419,079 B2 * 9/2008 Chen et al. ..... 227/130
2007/0175945 A1 * 8/2007 Chen et al. ..... 227/130
2007/0181629 A1 * 8/2007 Chen et al. ..... 227/130
2008/0190988 A1 8/2008 Pedicini et al.

* cited by examiner

*Primary Examiner* — Lindsay Low
(74) *Attorney, Agent, or Firm* — Aidenbaum Schloff and Bloom PLLC; Jay Schloff

(57) ABSTRACT

A fastener driving apparatus includes a power source, a control circuit, a motor, a first cylinder, a first piston, a linear motion converter, a second cylinder, a second piston, an anvil, a valve arrangement and at least one sensor. During a compression stroke, the first piston is configured to compress gas in a first cylinder to a predetermined pressure. At the predetermined pressure, the valve arrangement assumes an open position for communicating the compressed gas to the second cylinder, thereby causing the second piston to move linearly and enabling the anvil to drive the fastener into the workpiece. During a return stroke, at a predetermined position of the first piston in the first cylinder, the valve arrangement assumes the open position for communicating a vacuum created in the first cylinder to the second cylinder and thereby causing the second piston and the anvil to retract to their initial positions.

17 Claims, 10 Drawing Sheets

FASTENER DRIVING APPARATUS

Matter enclosed in heavy brackets [ ] appears in the original patent but forms no part of this reissue specification; matter printed in italics indicates the additions made by reissue.

CROSS REFERENCE TO RELATED APPLICATIONS

The present invention claims priority under 35 United States Code, Section 119 on the U.S. Provisional Patent Application numbered 61/208,556 filed on Feb. 25, 2009, the disclosure of which is incorporated by reference.

FIELD OF THE DISCLOSURE

The present disclosure generally relates to apparatuses for driving fasteners into workpiece, and more particularly, to a fastener driving apparatus used as a portable hand tool.

BACKGROUND OF THE DISCLOSURE

A fastener driving apparatus is a tool used to drive fasteners, such as nails and staples into a workpiece. The fastener driving apparatus may be used for various operations, such as making wooden walls, positioning hang sheathings over the wooden walls, fastening baseboards over a lower portion of an interior wall and crown molding.

There are various fastener driving apparatuses known in the art. These fastener driving apparatuses operate utilize various means and mechanisms known in the art for their operation. For example, the prior art fastener driving apparatuses may be operated based on compressed air generated by an air compressor, fuel cells, electrical energy, a flywheel mechanism, and the like.

Although these fastener driving apparatuses are useful in driving the fasteners into the workpiece, such apparatuses have numerous limitations. For example, the fastener driving apparatuses operated on the compressed air are bulkier, non-portable and costlier due to requirement of the air compressor and associated air-lines. Fastener driving apparatuses operated on the fuel cells are complicated in design and are expensive. Further, the apparatuses that are operated on the fuel cells require both electrical energy and fuel. More specifically, a spark source required for combustion of the fuel derives its energy from various electric energy sources such as batteries, and the like. Furthermore, the fastener driving apparatuses operated on the fuel cells generate loud report and release of combustion products.

Further, the fastener driving apparatuses operated on the electrical energy are limited to fasteners of relatively small lengths, such as one inch or less. Further, the fastener driving apparatuses operated on the electrical energy generate high reactionary force. The high reactionary force is a consequence of the comparatively longer time taken by such fastener driving apparatuses to drive the fasteners into the workpiece. Further, the fastener driving apparatuses operated on the electrical energy are limited in their repetition rate because of long time it takes to drive a fastener into the work piece. Moreover, although fastener driving apparatuses operated by flywheels are capable of driving the fasteners of longer sizes very quickly, these apparatuses are bulkier in sizes and weight. Further, drive mechanisms of these apparatuses are complicated in design, which results in a high cost of such apparatuses.

Additionally, a majority of the above-mentioned fastener driving apparatuses includes a striker mechanism for driving the fasteners into the workpiece. The striker mechanism may be retracted to its initial position by means of various retracting mechanisms, such as a spring, a bungee and the like. Although such striker mechanisms are useful in driving the fasteners into the workpiece, these retracting mechanisms have numerous limitations. For example, the retracting mechanisms, due to inertia associated therewith, consume significant drive energy of the fastener driving apparatuses and may prevent the fasteners from being fully driven into the workpiece. Accordingly, these retracting mechanisms may require an increase in power to drive the fasteners into the workpiece. Further, these retracting mechanisms reduce drive speed of the fastener driving apparatuses. Furthermore, the existing retracting mechanisms may bias the striker mechanism towards the workpiece, causing a safety hazard for the user.

Based on the foregoing, there exists a need for a fastener driving apparatus employing a retracting mechanism that precludes consumption of drive energy of the fastener driving apparatus and facilitates a fastener to be fully driven into a workpiece. The fastener driving apparatus should have the retracting mechanism capable of precluding reduction of drive speed of the fastener driving apparatus and should be capable of providing safety to a user. Further, the fastener driving apparatus should be portable in nature and should be capable of driving the fastener into the workpiece in a single stroke.

SUMMARY OF THE DISCLOSURE

In view of the foregoing disadvantages inherent in the prior art, the general purpose of the present disclosure is to provide a fastener driving apparatus that is configured to include all the advantages of the prior art, and to overcome the drawbacks inherent therein.

Accordingly, an object of the present disclosure is to provide a fastener driving apparatus employing a retracting mechanism that precludes consumption of drive energy and reduction in drive speed of the fastener driving apparatus and facilitate a fastener to be fully driven into a workpiece.

Another object of the present disclosure is to provide a fastener driving apparatus that is portable in nature and is capable of providing more safety to a user.

Yet another object of the present disclosure is to provide a fastener driving apparatus that is capable of driving a fastener into a workpiece in a single stroke and is capable of increasing efficiency of the fastener driving apparatus.

Still another object of the present disclosure is to provide a fastener driving apparatus that is capable of minimizing reactionary force generated during fastener driving operation.

In light of the above objects, a fastener driving apparatus for driving a fastener into a workpiece is disclosed. The fastener driving apparatus includes a power source, a control circuit, a motor, a first cylinder, a first piston, a linear motion converter, a second cylinder, a second piston, an anvil, a valve arrangement and at least one sensor. The control circuit is electrically coupled to the power source. The motor is electrically coupled to the power source and is responsive to the control circuit.

The first piston is reciprocally movable within the first cylinder to execute a compression stroke and a return stroke. The first piston is configured to define a gas chamber within the first cylinder. The gas chamber is capable of accommodating gas therein. The first piston is operationally coupled to the linear motion converter. The linear motion converter is driven by the motor. The linear motion converter is configured to reciprocally move the first piston within the first cylinder. The first cylinder is pneumatically connected to the second cylinder. The second piston is reciprocally movable within the second cylinder. The anvil is coupled to the second piston. The anvil is capable of striking the fastener to drive the fastener into the workpiece. The valve arrangement is operationally disposed between the first cylinder and the second cylinder for pneumatically connecting the first cylinder and the second cylinder. The valve arrangement is configured to define a gas passageway between the first cylinder and the second cylinder in an open position. Further, the valve arrangement is also configured to block the gas passageway in a closed position. The at least one sensor is communicably coupled to the control circuit. The at least one sensor is configured to detect at least one position of the operation cycle and communicate the detected position of the operation cycle to the control circuit. The control circuit is configured to stop an operation cycle of driving the fastener into the workpiece based on the detected position by the at least one sensor.

The control circuit is configured to actuate the valve arrangement to configure one of the open position and the closed position based on the detected position of the first piston.

During the compression stroke, the first piston is configured to move towards a top dead center of the first cylinder thereby compressing the gas in the gas chamber to a predetermined pressure. Further, the valve arrangement assumes the open position at the predetermined pressure for communicating the compressed gas to the second cylinder. The compressed gas communicated to the second cylinder causes the second piston to move linearly and enables the anvil to drive the fastener into the workpiece. During the return stroke, the valve arrangement assumes the closed position and the first piston is configured to move towards a bottom dead center of the first cylinder thereby creating a vacuum in the first cylinder between the top dead center of the first cylinder and the first piston. At a predetermined position of the first piston during the return stroke, the valve arrangement assumes the open position. The open position of the valve arrangement causes the vacuum created in the first cylinder to communicate to the second cylinder, thereby causing the second piston and the anvil to retract to initial positions of the second piston and the anvil.

This aspect together with other aspects of the present disclosure, along with the various features of novelty that characterize the present disclosure, are pointed out with particularity in the claims annexed hereto and form a part of this present disclosure. For a better understanding of the present disclosure, its operating advantages, and the specific objects attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description and claims taken in conjunction with the accompanying drawings, in which:

Like reference numerals refer to like parts throughout the description of several views of the drawings.

DETAILED DESCRIPTION OF THE DISCLOSURE

Figure 1:
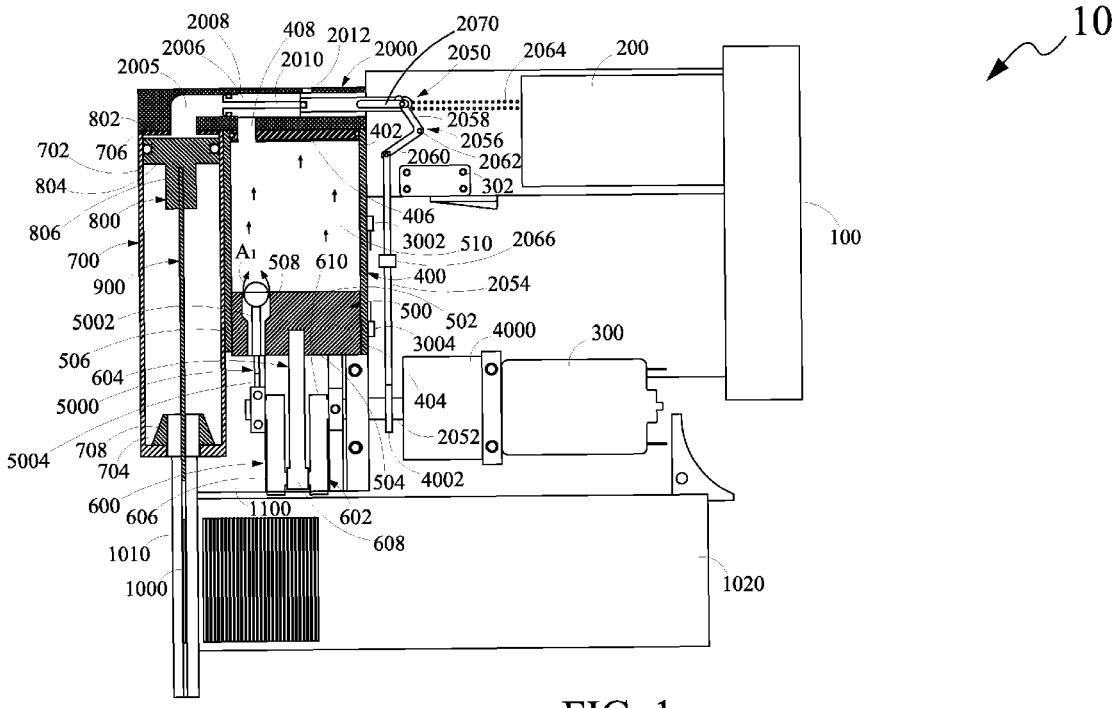
FIG. 1 illustrates a longitudinal cross-sectional view of a fastener driving apparatus depicting an initial stage of an operation cycle of driving a fastener from the fastener driving apparatus, in accordance with an embodiment of the present disclosure.

The exemplary embodiments described herein detail for illustrative purposes are subject to many variations in structure and design. It should be emphasized, however, that the present disclosure is not limited to a particular fastener driving apparatus as shown and described. It is understood that various omissions and substitutions of equivalents are contemplated as circumstances may suggest or render expedient, but these are intended to cover the application or implementation without departing from the spirit or scope of the claims of the present disclosure.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The present disclosure provides a fastener driving apparatus for driving fasteners into a workpiece. As used herein, the term "fastener" refers to, but is not limited to, a nail, a staple, and the like. Further, the term "gas" as used herein, refers to, but is not limited to "atmospheric air". Herein, the terms "gas" and "air" are interchangeably used throughout the description. Furthermore, an 'operation cycle' of driving a fastener refers to steps involved in driving the fastener completely into a workpiece from the fastener driving apparatus. The operation cycle may also be termed as a combination of a "compression stroke" and a "return stroke" of a first piston.

The fastener driving apparatus, disclosed in the present disclosure, includes a power source, a control circuit, a motor, a first cylinder, a first piston, a linear motion converter, a second cylinder, a second piston, an anvil, a valve arrangement and at least one sensor. The first piston is reciprocally movable within the first cylinder to execute a compression stroke and a return stroke. The first piston executes the compression stroke and return stroke with help of the motor and the linear motion converter. Operation of the motor is further controlled by the control circuit. The valve arrangement is configured to pneumatically connect the first cylinder and the second cylinder. The valve arrangement assumes one of an open position and a closed position during an operation cycle of driving a fastener into the workpiece. In the open position of the valve arrangement, the valve arrangement defines a gas passageway allowing any communication of gas between the first cylinder and the second cylinder. Further, in the closed position of the valve arrangement, the gas passageway is blocked to stop any communication of gas between the first and second cylinders.

During the compression stroke of the first piston in the first cylinder, the first piston is configured to move towards a top dead center of the first cylinder, thereby compressing gas in a gas chamber formed above an upper face of the first piston in the first cylinder to a predetermined pressure or a predetermined stroke of the first piston. Further, the valve arrangement assumes the open position at the predetermined pressure or the predetermined stroke and allows the compressed gas to communicate to the second cylinder. The compressed gas communicated to the second cylinder causes the second piston disposed in the second cylinder to move linearly. The anvil is coupled to the second piston. The anvil also moves linearly with the movement of the second piston and strikes the fastener thereby driving the fastener into the workpiece.

During the return stroke of the first piston in the first cylinder, the valve arrangement assumes the closed position, and the first piston is configured to move towards a bottom dead center of the first cylinder. Movement of the first piston towards the bottom dead center of the first cylinder creates a vacuum between the top dead center of the first cylinder and the first piston. When the first piston reaches a predetermined position in the first cylinder during the return stroke, the valve arrangement assumes the open position. The open position of the valve arrangement causes the vacuum created in the first cylinder to communicate to the second cylinder and thereby causes the second piston and the anvil to retract to their initial positions. Further, the fastener driving apparatus becomes ready for driving a next fastener from the fastener driving apparatus. The working mechanism and configuration of the fastener driving apparatus of the present disclosure is described herein in conjunction with FIGS. 1 to 8.

Referring to FIGS. 1 to 8, longitudinal cross-sectional views of a fastener driving apparatus 10 are illustrated. An operation cycle for driving a fastener 1000 from the fastener driving apparatus 10 will be described in conjunction with FIGS. 1 to 8. Referring particularly to FIG. 1, the fastener driving apparatus 10 includes a power source 100, a control circuit 200, a motor 300, a first cylinder 400, a first piston 500, a linear motion converter 600, a second cylinder 700, a second piston 800, an anvil 900, a valve arrangement 2000 and a pair of sensors 3002, 3004.

The power source 100 is configured to provide power for working of the fastener driving apparatus 10. The power source 100 may be a rechargeable battery, a battery pack, or any other power source such as an AC power supply. The power source 100 is electrically coupled to the control circuit 200. The power source 100 may be electrically coupled to the control circuit 200 by means of wired, wireless means or any other mechanism known in the art.

The control circuit 200 is configured to actuate the power source 100 for initiating the operation cycle for driving the fastener 1000. Similarly, the control circuit 200 is configured to deactivate the power source 100 after completion of the operation cycle. The control circuit 200 may be any of the various control circuits known in the art. In one embodiment of the present disclosure, the control circuit 200 may include a microprocessor, plurality of high power switching elements and control circuit inputs. Further, in another embodiment of the present disclosure, the control circuit 200 may include a limit switch coupled to cams and linkages. Further, the control circuit 200 may be configured to receive input signals from timers, sensors, and the like. Furthermore, the control circuit 200 may also be configured to provide an output signal to an interface, a LED, and the like. Moreover, in one embodiment of the present disclosure, the control circuit 200 may include at least one low battery indicator, a pulse control of motor power, a plurality of communication ports, a status display indicator, a fault lockout protection controller, and the like. The control circuit 200 is configured to control the working of the motor 300 by activating or deactivating the power source 100.

The motor 300 is electrically connected to the power source 100. The motor 300 may be electrically connected to the power source 100 by means of various means and mechanisms, such as an electric wire or a magnetic coupling. The motor 300 is further responsive to the control circuit 200. More specifically, the control circuit 200 is configured to direct the power from the power source 100 to the motor 300 for initiating the operation cycle of driving the fastener such as the fastener 1000 into the workpiece. Similarly, the control circuit 200 is configured to disconnect the power from the power source 100 to the motor 300 after completion of the operation cycle. In one embodiment of the present disclosure, the motor 300 may include a dynamic braking system for halting the rotations of the motor 300. Further, in one embodiment of the present disclosure, the fastener driving apparatus 10 may include a switch 302 for directing and disconnecting the power from the power source 100 to the motor 300 through the control circuit 200. More specifically, the switch 302 may be controlled by the control circuit 200 for appropriately actuating the starting and stopping of the operation cycle of fastener drive apparatus 10. The switch 302 may be an ON/OFF switch. The motor 300 is configured to impart a reciprocating movement to the first piston 500 in the first cylinder 400. The motor 300 provides the reciprocating movement to the first piston 500 through the linear motion converter 600. The linear motion converter 600 is configured to convert the rotational motion of the motor 300 into linear reciprocating movement of the first piston 500 within the first cylinder 400.

The linear motion converter 600 is driven by the motor 300. Without departing from the scope of the present disclosure, the linear motion converter 600 may be driven by the motor 300 through a speed reduction mechanism 4000. The speed reduction mechanism 4000 is configured to reduce the revolutions per minute (rpm) of the motor 300 depending upon a required speed of reciprocating movement of the first piston 500. In one embodiment of the present disclosure, the speed reduction mechanism 4000 may be a gear reduction mechanism. The speed reduction mechanism 4000 is connected to the linear motion converter 600 through a shaft 4002. In the present embodiment of the present disclosure, the linear motion converter 600 is shown as a crankshaft mechanism.

Herein, the linear motion converter 600 includes a crankshaft 602 and a connecting rod 604 connected to the crankshaft 602.

The crankshaft 602 includes a first end portion 606, a middle portion 608 and a second end portion 610. The first end portion 606 of the crankshaft 602 is connected to a body portion 1100 of the fastener driving apparatus 10 and the second end portion 610 is coupled to the shaft 4002 that is coupled the speed reduction mechanism 4000. The body portion 1100 refers to a structural framework on which various components of the fastener driving apparatus 10 may be disposed. Further, the speed reduction mechanism 4000 is coupled to the second end portion 610 of the crankshaft 602 for transmitting the rotational motion generated by the motor 300 to the crankshaft 602 and the connecting rod 604. The connecting rod 604 is connected to the middle portion 608 of the crankshaft 602. An upper end portion 612 of the connecting rod 604 is connected to the first piston 500. In one embodiment of the present disclosure, the upper end portion 612 of the connecting rod 604 is connected to the first piston 500 by means of a piston pin (not shown). Further, a lower end portion 614 of the connecting rod is connected to the middle portion 608 of the crankshaft 602. The lower end portion 614 of the connecting rod 604 may be connected to the middle portion 608 of the crankshaft 602 by means of various means and mechanisms, such as a nut and a bolt, a rivet, and the like.

Although, in the embodiment of the present disclosure shown in FIG. 1, the linear motion converter 600 is described in accordance with the crankshaft mechanism, but the linear motion converter 600 may include other arrangements, such as a slider crank arrangement, a rack and pinion arrangement, a lead screw arrangement, and the like.

Further, the first cylinder 400 of the fastener driving apparatus 10 includes an upper end portion 402, a lower end portion 404 and a cylinder end cap 406. The cylinder end cap 406 is configured on the upper end portion 402. The cylinder end cap 406 further includes an opening 408 configured thereon. The first cylinder 400 may have a volume that is proportional to the amount of energy required for driving the fastener 1000 into the workpiece. In one embodiment of the present disclosure, for driving an 18 gage fastener, the volume of the first cylinder 400 may be around 8 to 12 cubic inch at standard atmospheric temperature and pressure conditions.

The first piston 500 is disposed within the first cylinder 400. The first piston 500 includes an upper face 502, a lower face 504, a body portion 506 and a check valve 508. Further, the first piston 500 is configured to define a gas chamber 510 within the first cylinder 400. More specifically, the first piston 500 is configured to define the gas chamber 510 between the upper face 502 of the first piston 500 and the cylinder end cap 406 of the first cylinder 400. The gas chamber 510 is capable of accommodating gas therein. The first piston 500 is configured to reciprocally move within the first cylinder 400 to execute the compression stroke and the return stroke. During the compression stroke, the first piston 500 is configured to move from the lower end portion 404, i.e., Bottom Dead Center (BDC) of the first cylinder 400 to the upper end portion 402, i.e., Top Dead Center (TDC) of the first cylinder 400. Further, during the return stroke, the first piston 500 is configured to move from the upper end portion 402 (TDC) of the first cylinder 400 to the lower end portion 404 (BDC) of the first cylinder 400.

Before starting the compression stroke, the gas chamber 510 may have a volume of the gas stored therein, which is proportional to the amount of energy required for driving the fastener 1000 into the workpiece. In one specific embodiment of the present disclosure, for driving the 18 gage fastener, the gas chamber 510 may have a volume of about 9 to 11 cubic inches, before starting the compression stroke at standard atmospheric pressure and temperature conditions. More specifically, in this embodiment, for driving the 18 gage fastener, the gas chamber 510 may have a volume of about 10 cubic inches at standard atmospheric pressure and temperature conditions. The gas stored in the gas chamber 510 is prevented from flowing towards the lower face 504 of the first piston 500, as the check valve 508 assumes the closed position.

The check valve 508 is disposed in the body portion 506. More specifically, the check valve 508 may be disposed on a side portion of the body portion 506. However, the present disclosure is not limited to a particular disposition of the check valve 508 within the body portion 506. The check valve 508 is a unidirectional valve configured to allow atmospheric air to flow into the first cylinder 400 in an open position.

As shown in FIG. 1, the fastener driving apparatus 10 includes a vertical actuation member 5000 for the actuation of the check valve 508. The vertical actuation member 5000 may be disposed on the body portion 1100 of the fastener driving apparatus 10. More specifically, the vertical actuation member 5000 may be disposed adjacent to the connection of the first end portion 606 of the crankshaft 602 to the body portion 1100. The vertical actuation member 5000 includes a first end portion 5002 and a second end portion 5004. The first end portion 5002 of the vertical actuation member 5000 is connected to the body portion 1100. The second end portion 5004 is configured to actuate the check valve 508 to configure the open position of the check valve 508, when the first piston 500 reaches the lower end portion 404 of the first cylinder 400. In one embodiment, the check valve 508 may be configured such that when the crankshaft 602 rotates till 30 degrees from a starting point of the crankshaft 602, the gas chamber 510 is replenished with the atmospheric air. Herein, the starting point of the crankshaft 602 refers that when the crankshaft 602 is at the starting point, the first piston 500 is at the BDC of the first cylinder 400.

In another embodiment, instead of using the check valve 508, the diameter of the lower end portion 404 of the first cylinder 400 may be larger than remaining portion of the first cylinder 400. Further, the first piston 500 may include O rings formed on lateral surfaces thereof. When the first piston 500 moves towards the TDC of the first cylinder 400 from the BDC of the first cylinder 400, there are inlets formed between either sides of the first piston 500 and the lower end portion 404 of the first cylinder 400. The atmospheric air enters the gas chamber 510 through the inlets. Further, during the movement of the first piston 500 towards the TDC, when the O rings go past the lower end portion 404, i.e., an enlarged section of the first cylinder 400, the inlets are closed as O rings come in physical contact with walls of the remaining portion of the first cylinder 400. In one embodiment, positioning of the O rings on the first piston 500 and the dimensions of the lower end portion 404 may be such that with the rotation of the crankshaft 602 by 30 degrees from the starting point of the crankshaft 602, the gas chamber 510 is replenished with the atmospheric air.

Further, the fastener driving apparatus 10 may include at least one sensor such as a first sensor 3002 and a second sensor 3004, configured to detect at least one position of the operation cycle and communicate the detected position of the operation cycle to the control circuit. A sensor, such as a first sensor 3002 and a second sensor 3004, may be disposed anywhere within or on the apparatus that facilitates the sensor in determining the operation cycle of the apparatus. In a non-limiting embodiment, a first sensor 3002 and a second sensor 3004 are disposed on the first cylinder 400. More specifically, the first sensor 3002 is disposed on the upper end portion 402 of the first cylinder 400 and the second sensor 3004 is disposed on the lower end portion 404 of the first cylinder 400. The sensors 3002 and 3004 are communicably coupled to the control circuit 200. The sensors 3002 and 3004 are communicably coupled to the control circuit 200 by means of various wired or wireless means known to the person skilled in the art. Further, in an embodiment, the sensors 3002 and 3004 are configured to detect at least one position of the first piston 500. More specifically, the first sensor 3002 is configured to detect position of the first piston 500 when the first piston 500 approaches the TDC of the first cylinder 400. Similarly, the second sensor 3004 is configured to detect position of the first piston 500 when the first piston 500 approaches the BDC of the first cylinder 400. Further, the first sensor 3002 and the second sensor 3004 are configured to communicate the detected position of the first piston 500 to the control circuit 200. Based on the detected position by the sensor 3004, the control circuit 200 is configured to disconnect the power source 100 from the motor 300 to stop the operation cycle. It will be apparent that at least one sensor 3000 of the present disclosure may be configured at any location in or on the apparatus that causes the sensor discern a position of a component or components of the apparatus for determining a position of the operation cycle of the apparatus. In one embodiment, the control circuit 200 is configured to actuate the valve arrangement 2000 to configure one of the open position and the closed position based on the detected position of the first piston 500.

The sensors 3002 and 3004 may be selected from, but not limited to, one of or a combination of a limit switch, a Hall Effect sensor, a photo sensor, a reed switch, a timer and a current or voltage sensor without departing from the scope of the disclosure. The sensors 3002 and 3004 may also include Hall sensors combined with at least one magnet. The sensors 3002 and 3004 are shown as disposed on the upper end portion 402 and the lower end portion 404 in FIG. 1, however this disposition should not be considered limiting. In another embodiment, the pair of sensors 3000 may also be disposed on the first piston 500.

Further, the valve arrangement 2000 is operationally disposed between the first cylinder 400 and the second cylinder 700. The valve arrangement 2000 is disposed in a manner such that the valve arrangement 2000 acts as a medium for communicating gas between the first cylinder 400 and the second cylinder 700. The valve arrangement 2000 is configured to assume one of the open position and the closed position. The valve arrangement 2000 is configured to define a gas passageway 2005 between the first cylinder 400 and the second cylinder 700 in the open position. In one embodiment of the present disclosure, a volume of the gas passageway 2005 is less than 15% of the volume of the first cylinder 400. The volume of the gas passageway 2005 may be less than 15% of the volume of the first cylinder 400 for minimizing losses related to accumulation of the gas in the gas passageway 2005, and thereby increasing the efficiency of the fastener driving apparatus 10. The valve arrangement 2000 is configured to block the gas passageway 2005 in the closed position of the valve arrangement 2000.

The valve arrangement 2000 includes a valve spool 2006 and a valve body 2008. The valve spool 2006 is slidably disposed in the valve body 2008. The valve spool 2006 may include an elongated groove 2010 configured on a central portion thereof. Further, in one embodiment of the present disclosure, the valve spool 2006 may be held in position by means of a spring (not shown) and pressure balance between two o-rings (not shown). The valve body 2008 may further include an vent opening 2012 configured thereon. In the closed position of the valve arrangement 2000, the vent opening 2012 is configured to receive gas from the elongated groove 2010 and pass the gas to atmosphere.

The valve arrangement 2000 assumes the open position and the closed position by utilizing a coupling member 2050. The coupling member 2050 is operably coupled between the motor 300 and the valve arrangement 2000. In one embodiment, the coupling member 2050 may be operatively connected between the speed reduction mechanism 4000 and the valve spool 2006. The coupling member 2050 is configured such that it imparts a linear movement to the valve spool 2006 in response to the rotation movement of the motor 300 for covering/uncovering the opening 408, thereby defining the gas passageway 2005. Accordingly, the valve arrangement 2000 may assume the open position or the closed position.

In one embodiment, the coupling member 2050 may include a cam 2052, a pushrod 2054, a rocker arm 2056 and a cam guide 2066. In one form, the cam 2052 may be coupled to the shaft 4002 that is coupled to the speed reduction mechanism 4000, so that the cam 2052 may rotate about axis of the shaft 4002. The pushrod 2054 operably couples the cam 2052 to the rocker arm 2056. The rocker arm 2056 has a first arm 2058 and a second arm 2060. The first arm 2058 is connected to a rear portion of the valve spool 2006 and the second arm 2060 is connected to the pushrod 2054. The first arm 2058 and the second arm 2060 are pivotally connected to each other at a pivot point 2062. Further, the second arm 2060 is also pivotally connected to the pushrod 2054. The cam guide 2066 guides the upward and downward movement of the pushrod 2054.

The cam 2052 has a suitable profile such that with the rotation of the cam 2052, the pushrod 2054 is moved towards and away from the shaft 4002 and acts on the rocker arm 2056 such that the rocker arm 2056 actuates the valve spool 2006 for the valve arrangement 2000 to assume the open position and the closed position. In one form, the cam 2052 has a profile having two rises and two falls in 360 degrees rotation about the shaft 4002 in one operation cycle. When the pushrod 2054 is pushed away from the shaft 4002, the pushrod 2054 pushes the second arm 2060 to rotate in a clockwise manner about the pivot point 2062. Due to the clockwise rotation of the second arm 2060 about the pivot point 2062, the first arm 2058 pulls the valve spool 2006 away from the opening 408 and compresses a valve spool return spring 2064. Accordingly, the valve spool 2006 unblocks the opening 408, thereby causing the valve arrangement 2000 to assume the open position.

Further, with the rotation of the cam 2052 and due to a fall profile of the cam 2052, the pushrod 2054 comes towards the shaft 4002, thereby causing the second arm 2060 to make a counter clockwise rotation about the pivot point 2062. Further, the first arm 2058 moves away from the valve spool return spring 2064, which is in compressed state. The release of the valve spool return spring 2064 further helps the valve spool 2006 to come toward the opening 408 and thereby closes the opening 408. Accordingly, the valve arrangement 2000 assumes the closed position. In one embodiment, the valve spool 2006 includes a slot 2070 configured in the rear portion of the valve spool 2006. In this embodiment, the valve spool return spring 2064 which is in compressed state when the valve arrangement 2000 is in open position, expands and pushes the valve spool 2006 to cover the opening 408. In this embodiment, the first arm 2058 moves within the slot 2070. The slot 2070 provides the valve spool 2006 for lost motion control as the valve spool 2006 opens at high speed in relation to speed of the rocker arm 2056. More specifically, the slot 2070 allows the valve spool 2006 to open rapidly after the valve spool 2006 is tripped by the rocker arm 2056.

In one embodiment of the present disclosure, the valve arrangement 2000 has a flow coefficient (Cv) greater than one. The flow coefficient describes the relationship between the pressure drop across a valve and corresponding flow rate. A valve arrangement having higher flow coefficient provides a larger flow of gas through valve arrangement at a given pressure drop. Further, the valve arrangement 2000 is configured as a snap acting valve. The snap acting valve may be defined as a valve that has an opening time of less than 20 milliseconds. Herein, the opening time of the valve represents a time involved in opening of the valve from the initial closed position to a position at which about 70 percent of full flow of the compressed gas in the valve may be achieved.

The second cylinder 700 is pneumatically connected to the first cylinder 400 via the valve arrangement 2000. The second cylinder 700 is positioned parallel to the first cylinder 400. The second cylinder 700 acts as an expansion cylinder, where the compressed gas within the first cylinder 400 is allowed to expand when the valve arrangement 2000 assumes the open position after the compression stroke of the first piston 500. The second cylinder 700 includes a proximal end portion 702, a distal end portion 704 and a top plate 706. Further, a bumper 708 may be disposed in the distal end portion 704 of the second cylinder 700. The bumper 708 is configured to absorb excess energy at the end of an expansion stroke, i.e., when the anvil 900 strikes the fastener 1000. The bumper 708 may be composed of various impact energy absorbing materials, such as an elastomer, and the like.

The second piston 800 is disposed within the second cylinder 700. The second piston 800 is configured to reciprocally move within the second cylinder 700. The anvil 900 is coupled to a rear face 804 of the second piston 800 by means of a connector 806 coupled to the rear face 804. The connector 806 may be coupled to the rear face 804 by means of various means and mechanisms, such as a nut and bolt arrangement, a rivet, welding and other arrangements known in the art. The anvil 900 may be secured in a central groove (not shown) of the connector 806, by use of suitable means, such as a nut and bolt arrangement, a rivet, welding, and the like known in the art. Further, in one embodiment of the present disclosure, the connector 806 and the anvil 900 may also be configured as a single unit.

The anvil 900 is configured to reciprocally move along with the second piston 800. The anvil 900 is capable of linearly moving within the second cylinder 700 and a fastener guide 1010. Further, the anvil 900 is capable of striking the fastener 1000 to drive the fastener 1000 into the workpiece. The fastener guide 1010 is configured to receive the fastener 1000 from a fastener feeder 1020.

Further, in one embodiment of the present disclosure, the second cylinder 700 may further include a second bumper disposed on the proximal end portion 702 of the second cylinder 700 for absorbing excess energy when the second piston 800 is retracted to its initial position. Furthermore, in one embodiment of the present disclosure, the second cylinder 700 may include an o-ring or a recess in the top plate 706 for maintaining the second piston 800 and the anvil 900 to their initial positions (pre-fastener driving positions as shown in FIG. 1). Moreover, in one embodiment of the present disclosure, the second cylinder 700 may include a magnet disposed on the top plate 706 and a piece of ferrous material in the anvil 900 for maintaining the second piston 800 and the anvil 900 to their initial positions. Accordingly, by maintaining the second piston 800 and the anvil 900 in their upper positions and ensuring that there is little or no extra dead volume between the second piston 800 and the top plate 706, maximum efficiency may be achieved as the expansion of the gas after the compression stroke acts directly on the second piston 800. Further, such arrangement precludes any accidental release of the anvil 900 and thereby facilitates more safety to the user.

The operation cycle of the fastener driving apparatus 10 is shown in a progressive manner in FIGS. 1 to 8, and will now be described with reference to FIGS. 1 to 8.

Referring again to FIG. 1, a first stage of the operation cycle of the fastener driving apparatus 10 is shown. At this stage of the operation cycle, the first piston 500 is at the BDC of the first cylinder 400, and the second piston 800 and the anvil 900 are at the proximal end portion 702 of the second cylinder 700, the valve arrangement 2000 is in the closed position, the fastener 1000 is disposed in the fastener guide 1010 and the motor 300 is in an OFF state. Positioning of the second piston 800 and the anvil 900 at the proximal end portion 702 represent 'initial positions' of the second piston 800 and the anvil 900 at the beginning of the operation cycle. As the first piston 500 is at the BDC, the vertical actuation member 5000 keeps the check valve 508 in the open position. In the open position of the check valve 508, the atmospheric air gets filled in the gas chamber 510 from the check valve 508 as shown by arrows 'A1' in FIG. 1. Alternatively, in another embodiment of the present disclosure, the atmospheric air may be filled in the gas chamber 510 by means of the series of holes or the enlarged opening configured in the lower end portion 404 of the first cylinder 400. Further, the check valve 508 in its closed position prevents any exit of gas from the gas chamber 510.

Further, for initiating the operation cycle of the fastener driving apparatus 10, the user may actuate the switch 302. The control circuit 200 by means of the second sensor 3004 ensures that the first piston 500 is at the BDC of the first cylinder 400. After ensuring that the first piston 500 is at the BDC of the first cylinder 400, the control circuit 200 actuates the power source 100 to supply power to the motor 300. The motor 300 then drives the linear motion converter 600, which in turn facilitates the first piston 500 to execute the compression stroke. The valve arrangement 2000 is in the closed position and the first piston 500 moves from the lower end portion 404, i.e., BDC of the first cylinder 400 towards the upper end portion 402, i.e., TDC of the first cylinder 400. Further, as the first piston 500 moves towards the TDC, the vertical actuation member 5000 causes the check valve 508 to assume the closed position. More specifically, due to a pressure difference on both sides of the check valve 508 (inside and outside of the first cylinder 400), the check valve 508 is configured to assume the closed position. Further, as valve arrangement 2000 is in the closed position, the first piston 500 compresses the gas in the gas chamber 510. During the compression stroke, due to the cam rise profile of the cam 2052 that is rotating, the second arm 2060 starts rotating in the clockwise direction about the pivot point 2062. Accordingly, the first arm 2058 starts pulling the valve spool 2006 rearward in order to uncover the opening 408. Further, the valve spool return spring 2064 also starts compressing as the valve spool 2006 moves rearward.

Figure 2:
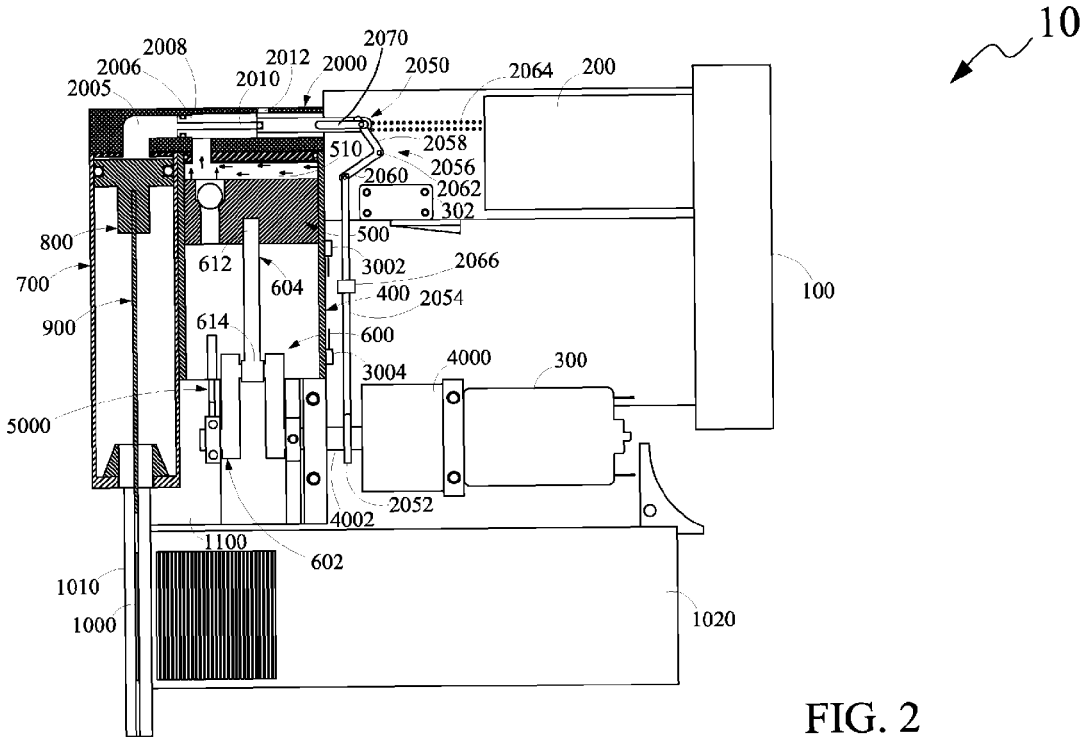
FIG. 2 illustrates a longitudinal cross-sectional view of the fastener driving apparatus depicting compression of gas in a gas chamber to a predetermined pressure, in accordance with an embodiment of the present disclosure.

Further, as shown in FIG. 2, as the first piston 500 reaches the TDC of the first cylinder 400, the gas is compressed to a predetermined pressure. In one embodiment of the present disclosure, for driving a standard 18 gages and 2 inches long fastener 1000, the gas in the gas chamber 510 may be compressed to a predetermined pressure of 160 psi (pounds per square inch) with a volume of the compressed gas being approximately one cubic inch. The first piston 500 is configured to compress the gas in the gas chamber 510 at the predetermined pressure in a single rapid linear stroke, i.e., the compression stroke. By compressing the gas in the gas chamber 510 in the single rapid linear stroke, the gas is compressed in a way such that the pressure of the compressed gas exceeds a pressure that will be predicted by the formula P1V1=P2V2. Herein, P1 and P2 represent pressure of the gas and V1 and V2 represent volume of the gas. Such increase in the pressure may be modeled with a compression exponent greater than 1.05. Compression exponents greater than 1.05 yield higher gas pressures for a given compression ratio than the gas pressure for a compression done in a normal manner. More specifically, such a compression exponent allows more energy to be stored in the compressed gas than the energy stored if the compression were done via a normal multi-stroke compressor (in which the heat of compression may be lost to the environment.)

A formula for compression exponent greater than 1.05 may be written as: $PV^n=K$, where P is pressure of the compressed gas, V is volume of the compressed gas, n is the compression exponent and K is a constant. For air in an isothermal compression, the compression exponent is 1.05, and for an adiabatic compression the compression exponent is about 1.4. In an embodiment of the present disclosure, as the compression cycle is sufficiently short, the gas in the gas chamber 510 may be compressed to the predetermined pressure at a compression exponent of approximately at least 1.1.

Further, as the first piston 500 reaches towards the TDC of the first cylinder 400, due to the rise profile of the rotating cam 2052, the second arm 2060 continues rotating in the clockwise direction about the pivot point 2062. Accordingly, the first arm 2058 pulls the valve spool 2006 rearward in order to uncover the opening 408 for configuring the open position of the valve arrangement 2000, which is shown in FIGS. 3 and 4.

Figure 3:
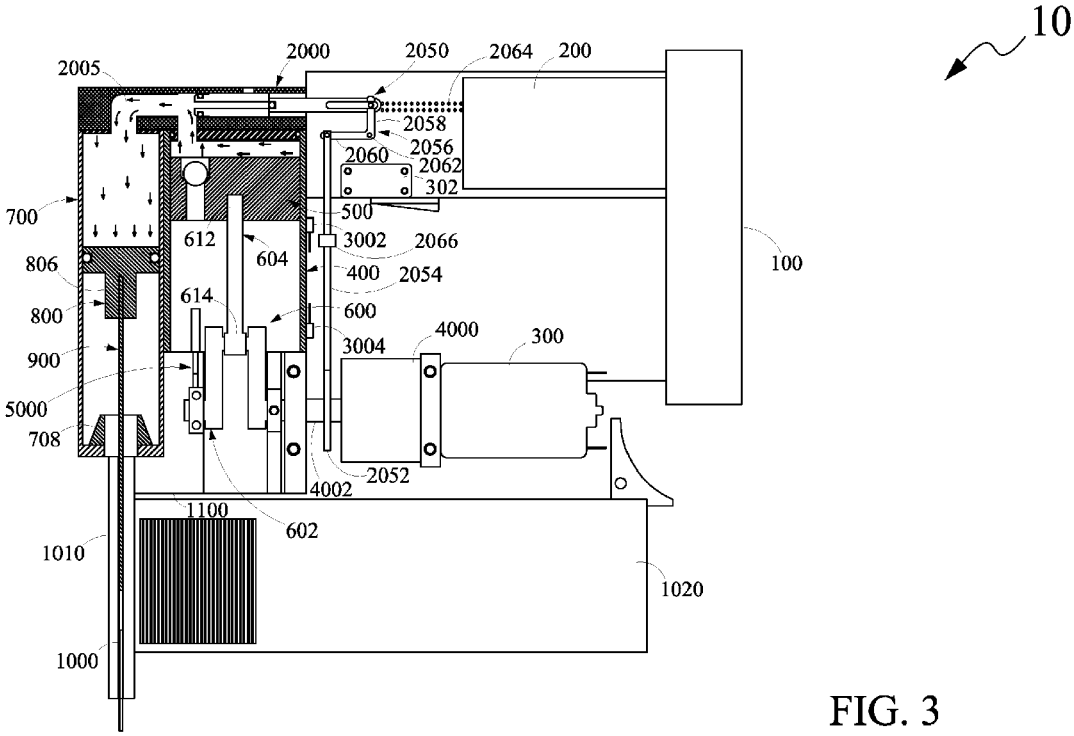
FIGS. 3 and 4 illustrate longitudinal cross-sectional views of the fastener driving apparatus depicting rapidly expanding gas driving a second piston and an anvil in a downward direction for driving the fastener into a workpiece, in accordance with an embodiment of the present disclosure.
Figure 4:
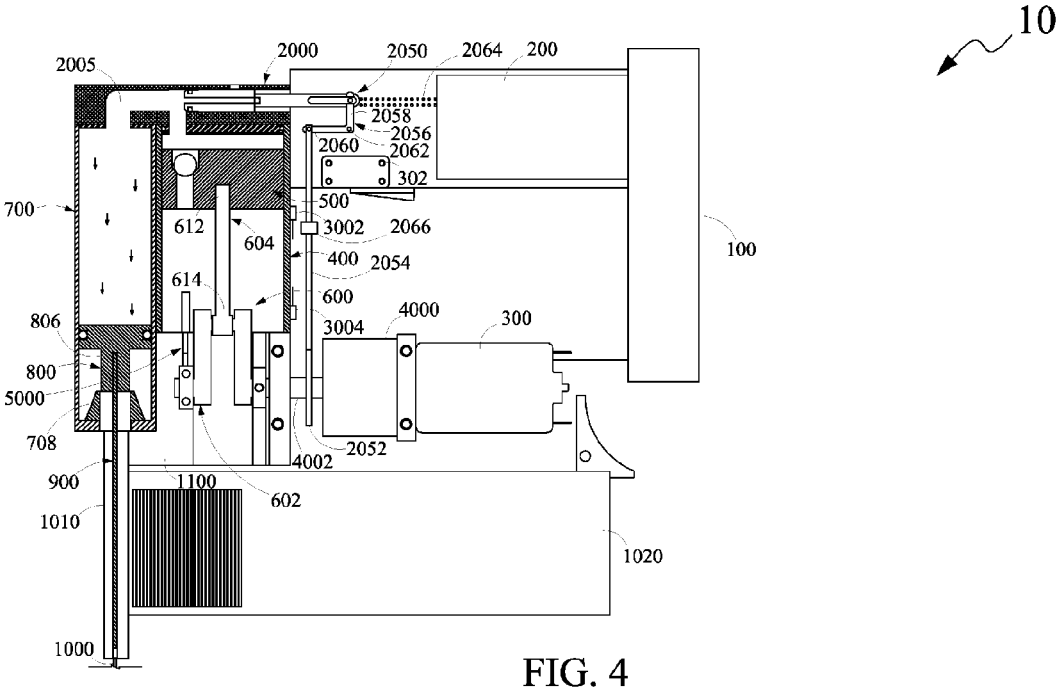

Now referring to FIG. 3 and FIG. 4, next stages of the operation cycle are shown. Particularly as shown in FIG. 3, the valve arrangement 2000 assumes the open position after completion of the compression stroke. As the valve arrangement 2000 is in the open position, the compressed gas at the predetermined pressure in the first cylinder 400 is communicated to the second cylinder 700 through the gas passageway 2005. The compressed gas is then allowed to expand in the second cylinder 700 causing the second piston 800 and the anvil 900 to move linearly in a downward direction. Further, the anvil 900 extends along a longitudinal axis of the second cylinder 700 into the fastener guide 1010 for striking the fastener 1000. The anvil 900, upon striking the fastener 1000, is capable of driving the fastener 1000 into the workpiece as shown in FIG. 4.

As the compressed gas from the first cylinder 400 is rapidly communicated to the second cylinder 700 through the gas passageway 2005, such rapid communication of the compressed gas from first cylinder 400 to the second cylinder 700 yields a rapid acceleration of the second piston 800 and the anvil 900 in the downward direction. Such rapid acceleration of the second piston 800 and the anvil 900 results in a quick fastener drive stroke with a low reaction force. Additionally, the linear movement of the anvil 900 through the fastener guide 1010 enables in jam clearing of the fastener guide 1010. Such jam clearing removes the fastener fragments or other debris inside the fastener guide 1010 and thereby avoids the need of any manual operation for cleaning the fastener guide 1010. Accordingly, this would automatically make the fastener guide 1010 ready for a next operation cycle of driving the fastener 1000.

Figure 5:
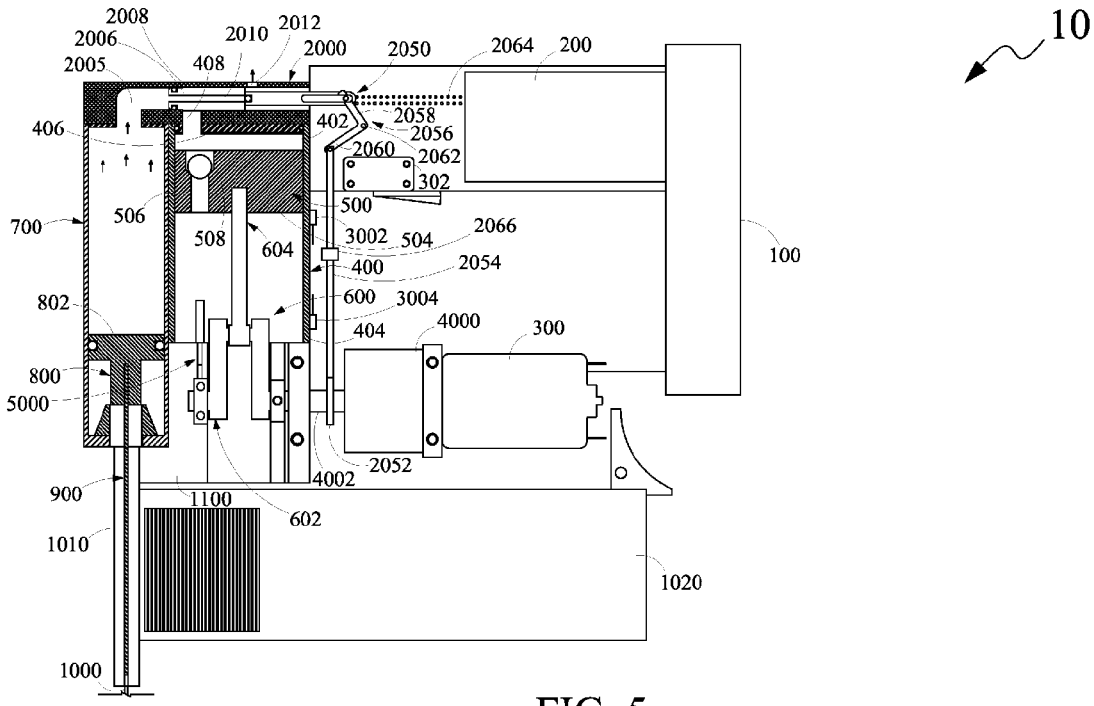
FIG. 5 illustrates a longitudinal cross-sectional view of the fastener driving apparatus depicting a closed position of a valve arrangement and a first piston performing a return stroke, in accordance with an embodiment of the present disclosure.

After the fastener 1000 is fully driven into the workpiece, the valve arrangement 2000 is configured to assume the closed position. Due to the fall profile of the rotating cam 2052, the second arm 2060 is free to rotate in the counter clockwise direction about the pivot point 2062. Further, the valve spool return spring 2064 which is in the compressed state during the open position of the valve arrangement 2000, starts expanding and thereby pushes the valve spool 2006 forward in order to cover the opening 408. Accordingly, the valve arrangement 2000 assumes the closed position, as shown in FIG. 5. Further, due to continuous rotation of the motor 300, the first piston 500 is configured to execute the return stroke. During the return stroke, the first piston 500 moves downwardly from the upper end portion 402, i.e., the TDC of the first cylinder 400 towards the lower end portion 404, i.e., the BDC of the first cylinder 400. Further, due to the closed position of the valve arrangement 2000 and the closed position of the check valve 508, a vacuum is created between the TDC of the first cylinder 400 and the first piston 500. More specifically, the vacuum is created between the upper face 502 of the first piston 500 and the cylinder end cap 406.

Further, as shown in FIG. 5, excess gas in the second cylinder 700 may be vented to the atmosphere. The excess gas in the second cylinder 700 may be vented to the atmosphere by means of the elongated groove 2010 of the valve spool 2006 and the vent opening 2012 configured on the valve body 2008. Accordingly, such venting of the excess gas in the second cylinder 700 facilitates reduction of gas pressure above the front face 802 of the second piston 800. Furthermore, in the case that the movement of the first piston 500 is impeded to any extent, such venting releases the pressure on the second piston 800 and the anvil 900, thus providing safety to the user.

Figure 6:
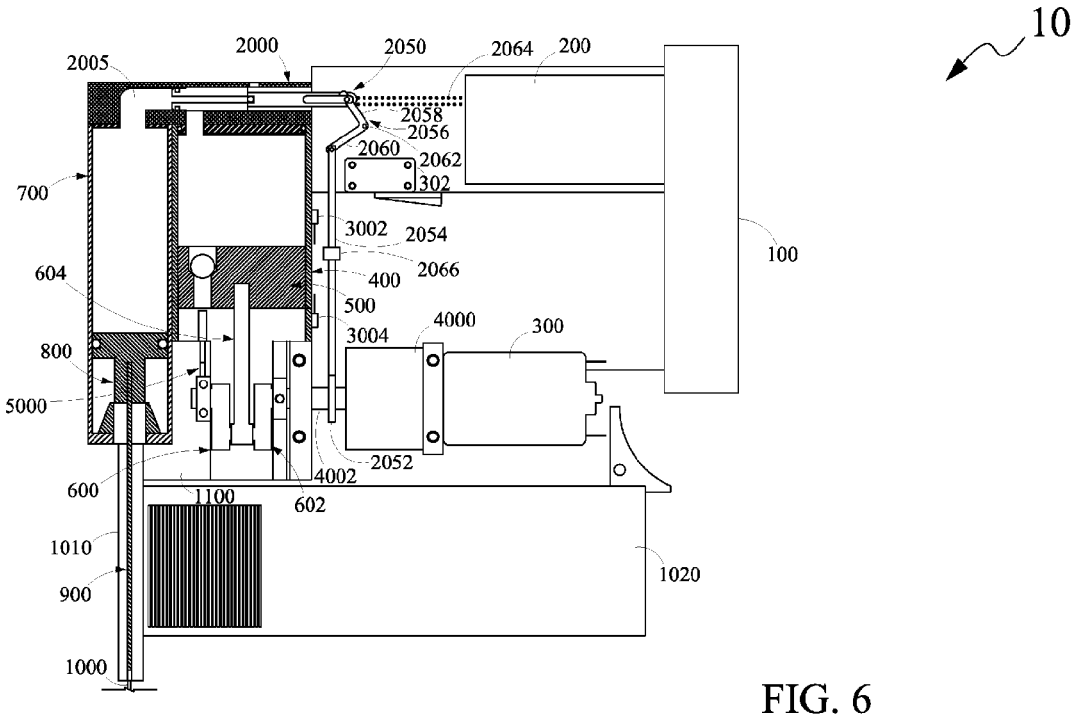
FIG. 6 illustrates a longitudinal cross-sectional view of the fastener driving apparatus depicting the closed position of the valve arrangement and the first piston generating vacuum in a first cylinder, in accordance with an embodiment of the present disclosure.

Further, as shown in FIG. 6, during the return stroke of the first piston 500, when the first piston 500 reaches a predetermined position, the vacuum created within the first cylinder 400 is sufficient such that the second piston 800 and the anvil 900 may be retracted to their initial positions (as shown in FIG. 1), if the vacuum is communicated to the second cylinder 700. Accordingly, when the first piston 500 reaches the predetermined position in the first cylinder 400, the rocker arm 2056 continues rotating in the clockwise direction about the pivot point 2062 due to the cam rise profile of the rotating cam 2052. Accordingly, the first arm 2058 pulls the valve spool 2006 rearward in order to uncover the opening 408 for configuring the open position of the valve arrangement 2000, which is shown in FIG. 7.

Figure 7:
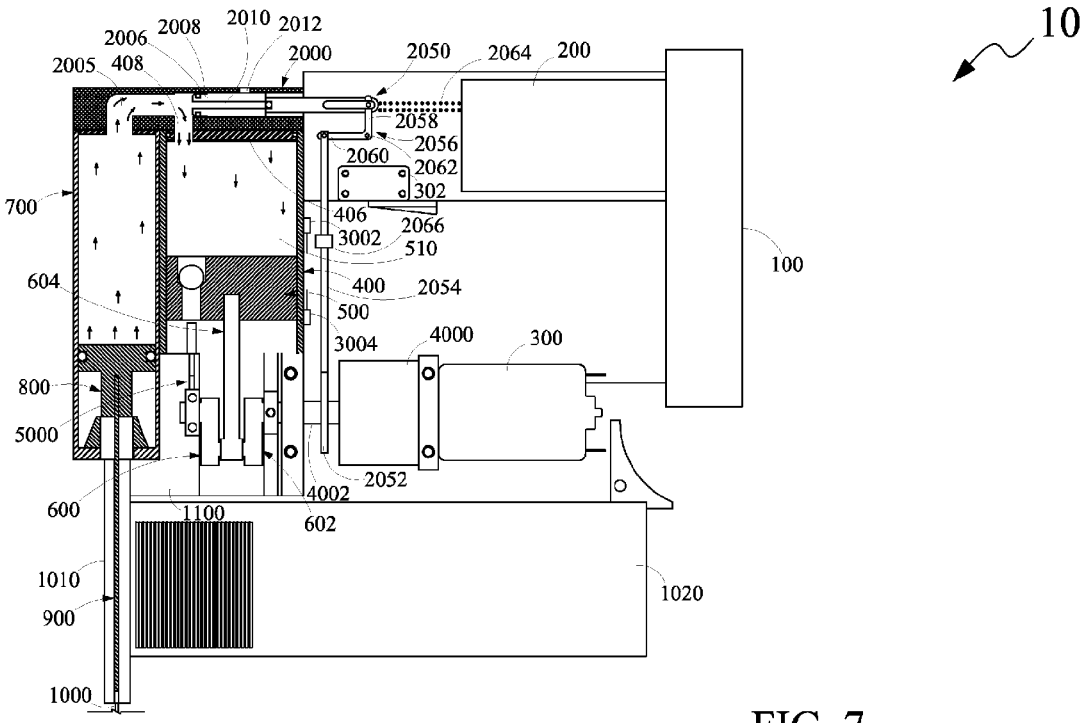
FIG. 7 illustrates a longitudinal cross-sectional view of the fastener driving apparatus depicting an open position of the valve arrangement communicating the vacuum created in the first cylinder to the second cylinder for retracting the second piston and the anvil to their initial positions, in accordance with an embodiment of the present disclosure.

Further, a next stage of the operation cycle is illustrated in FIG. 7. The first arm 2058 pulls the valve spool 2006 rearward and uncovers the opening 408 configured on the cylinder end cap 406 of the first cylinder 400 to configure the open position of the valve arrangement 2000. Thereafter, the vacuum created in the first cylinder 400 is communicated to the second cylinder 700. More specifically, the vacuum created in the first cylinder 400 is filled by the gas communicated from the second cylinder 700, when the valve arrangement 2000 assumes the open position.

Figure 8:
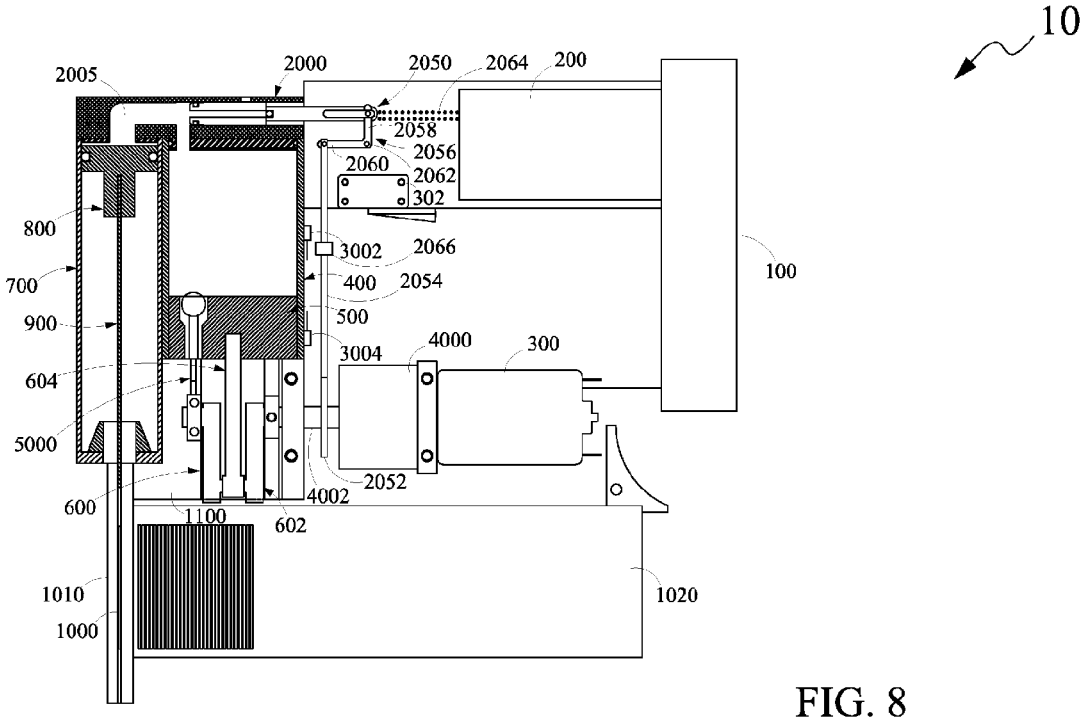
FIG. 8 illustrates a longitudinal cross-sectional view of the fastener driving apparatus depicting vacuum retracted initial positions of the second cylinder and the anvil, in accordance with an embodiment of the present disclosure.

Furthermore, as shown in FIG. 8, the vacuum communicated to the second cylinder 700 causes the second piston 800 and the anvil 900 to retract to their initial positions. Further, as the first piston 500 is configured to reach to the BDC of the first cylinder 400, the second piston 800 and the anvil 900 are returned to their initial positions. It would be apparent to those skilled in the art that the second piston 800 and the anvil 900 are retracted to their initial positions without utilizing any drive energy of the fastener driving apparatus 10. Further, a person skilled in the art would appreciate that virtually all energy from the fastener driving apparatus 10 is utilized to drive the fastener 1000 into the workpiece, as the retraction of the second piston 800 and the anvil 900 is performed automatically as the first piston 500 moves towards the BDC of the first cylinder 400 during the return stroke. More specifically, the return of the second piston 800 and the anvil 900 is vacuum actuated, and does not utilize any energy used for driving the fastener 1000.

Hence, a person skilled in the art would appreciate that the vacuum generated in the first cylinder 400 acts as 'the retracting mechanism' in the fastener driving apparatus 10 of the present disclosure. It would be apparent to those skilled in that art that the anvil 900 of the present disclosure do not require any specific retracting mechanism such as compressing an anvil return spring or a bungee, the fastener driving apparatus 10 of the present disclosure increases the drive speed of the present disclosure. Further, the kinetic energy caused by the axial movement of the second piston 800, the connector 806 and the anvil 900 is absorbed by the bumper 708.

As the second piston 800 and the anvil 900 reach to their initial positions, the valve arrangement 2000 is configured to assume the closed position as shown in FIG. 1. When the first piston 500 reaches the BDC of the first cylinder 400, the second sensor 3004 detects the presence of the first piston 500 at the BDC, and the control circuit 200 receives the detected position from the second sensor 3004. Further, the control circuit 200 is configured to disconnect the power source 100 from the motor 300 to stop the operation cycle based on feedback from the second sensor 3004. More specifically, the control circuit 200 disconnects the power from the power source 100 to the motor 300 so that motor 300 stops actuating the linear motion converter 600 for linearly moving the first piston 500 inside the first cylinder 400. In one embodiment of the present disclosure, the motor 300 may be stopped by means of dynamic braking mechanism. It would be apparent to those ordinary skilled in the art that in this condition, the fastener driving apparatus 10 is in a ready position for performing a next operation cycle of the fastener driving operation. Accordingly, in a single stroke of the first piston 500 the operation cycle of the fastener driving is completed by the fastener driving apparatus 10. Accordingly, with each triggering (i.e., powering of the switch 302), one fastener, such as the fastener 1000, is driven into the workpiece. It would be apparent to those ordinary skilled in the art that in case of continuous driving of fasteners 1000, the motor 300 may be continued as running in order to execute the successive operation cycles in a continuous manner.

Figure 9:
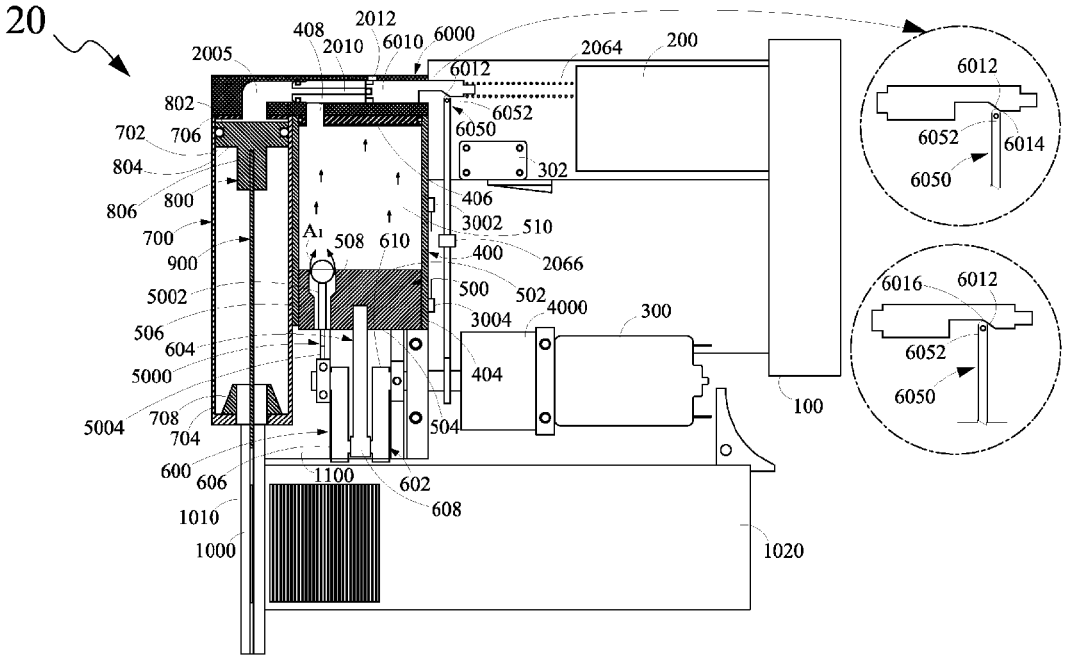
FIG. 9 illustrates a longitudinal cross-sectional view of the fastener driving apparatus, in accordance with another embodiment of the present disclosure.

Referring now to FIG. 9, in another embodiment of the present invention, a fastener driving apparatus 20 having a valve arrangement such as a valve arrangement 6000 and a coupling member such as a coupling member 6050, is shown. The valve arrangement 6000 includes a valve spool 6010, which has a cam ramp 6012 configured on a rear portion 6014 of the valve spool 6010. The rear portion 6114 of the valve arrangement 6000 is also operably coupled to a valve spool return spring such as the valve spool return spring 2064.

The coupling member 6050 includes a cam such as the cam 2052, a pushrod 6052 and a cam guide such as the cam guide 2066. The pushrod 6052 is operatively coupled to the cam 2052. With the rotation of the cam 2052, the pushrod 6052 executes an upward and downward movement, i.e., towards and away from the shaft 4002. As shown in FIG. 9, the pushrod 6052 acts against a cam ramp 6012 on the valve spool 6010 to configure the open position or the closed position of the valve arrangement 2000. The valve spool return spring 2064 also aids in closing the opening 408 when the pushrod 6052 retracts, i.e., goes towards the shaft 4002.

For example, as shown in FIG. 9, due to variable profile of the cam 2052, when the pushrod 6052 is in contact with the cam ramp 6012 at a point 6016, the valve arrangement 6000 is in the closed position. Due to the cam rise profile of the cam 2052, the pushrod 6052 is driven in the upward direction, i.e., away from the shaft 4002. As the pushrod 6052 acts against the cam ramp 6012 to proceed in the upward direction, a resultant force is applied that pushes the valve spool 6010 in the rearward direction in order to uncover the opening 408 (when the pushrod 6052 is in contact with the cam ramp 6012 at a point 6018). Due to this, the valve arrangement 6000 assumes the open position and simultaneously the valve spool return spring 2064 also compresses. It would be apparent to those skilled in the art that in an operation cycle, the cam 2052 will rotate by 360 degrees, and the cam 2052 will have a profile having two rises and two falls.

Figure 10:
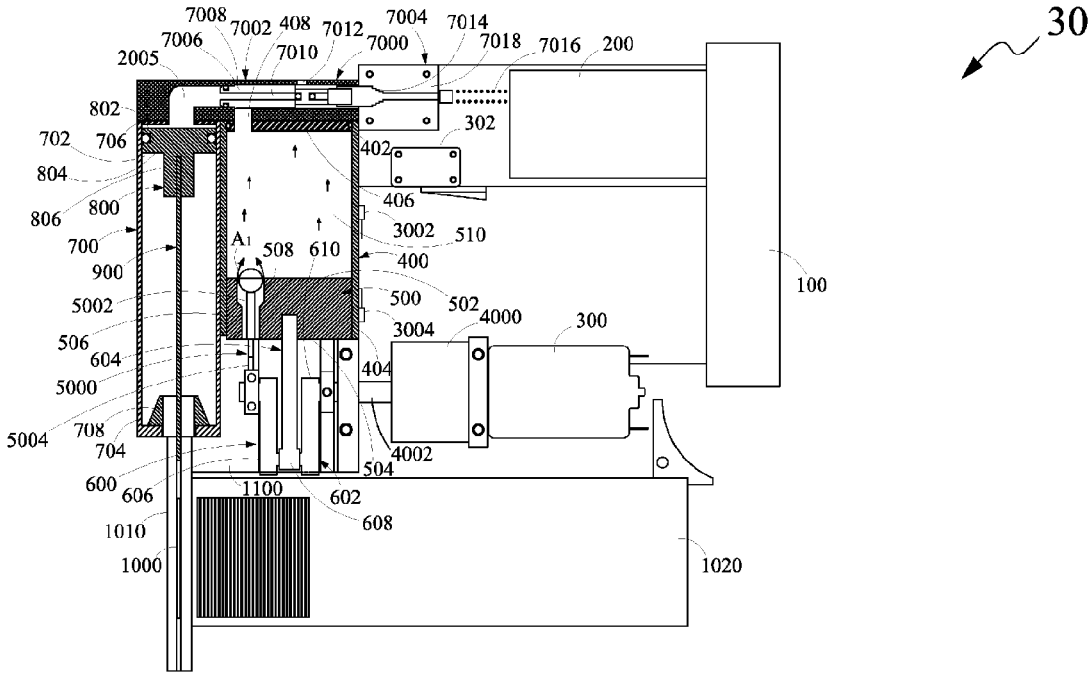
FIG. 10 illustrates a longitudinal cross-sectional view of the fastener driving apparatus, in accordance with yet another embodiment of the present disclosure.

Referring now to FIG. 10, yet another embodiment of the present invention having a valve arrangement such as a valve arrangement 7000 utilized in a fastener driving apparatus 30, is shown. The fastener driving apparatus 30 does not utilize any coupling member such as the coupling member 2050 operatively coupled between the valve arrangement 7000 and the motor 300.

The valve arrangement 7000 may include a pneumatic valve 7002 and a valve solenoid 7004. The valve solenoid 7004 is configured to actuate the pneumatic valve 7002. The pneumatic valve 7002 includes a valve spool 7006 and a valve body 7008. The valve spool 7006 is slidably disposed in the valve body 7008. The valve spool 7006 may include an elongated groove 7010 configured on a central portion thereof. Further, in one embodiment of the present disclosure, the valve spool 7006 may be held in position by means of a spring (not shown) and pressure balance between two o-rings (not shown). The valve body 7008 may further include a vent opening 7012 configured thereon. In the closed position of the valve arrangement 7000, the vent opening 7012 is configured to receive gas from the elongated groove 7010 and pass the gas to atmosphere.

Further, the valve solenoid 7004 includes an actuating member 7014, a solenoid return spring 7016, and a solenoid member 7018. The actuating member 7014 is configured to actuate the valve spool 7006 to configure one of the closed position and the open position of the valve spool 7006. The solenoid return spring 7016 is functionally coupled to the actuating member 7014. The solenoid member 7018 is configured to actuate the actuating member 7014 and the solenoid return spring 7016 such that the valve spool 7006 may assume one of the open position and the closed position. The solenoid member 7018 is electrically coupled to the control circuit 200 that is configured to actuate the solenoid member 7018. The solenoid member 7018 may be electrically coupled to the control circuit 200 by means of wired, wireless or any other means known in the art. The control circuit 200 may actuate the solenoid member 7018 for configuring the valve arrangement to assume one of the open position and the closed position based on the position of the first piston 500 detected within the first cylinder 400 and timings of start and stop of an operation cycle of the fastener driving apparatus 30.

More specifically, for configuring the open position of the valve arrangement 7000, i.e., the open position of the valve spool 7006, the solenoid member 7018 actuates the actuating member 7014. Further, the actuating member 7014 moves the valve spool 7006 towards the solenoid member 7018 and unblocks the opening 408 configured on the cylinder end cap 406 of the first cylinder 400. More specifically, once the valve spool 7006 is cracked open by the solenoid member 7018, the gas pressure may act on a front face (not shown) of the valve spool 7006 and moves the valve spool 7006 towards the solenoid member 7018 very fast and snaps the valve spool 7006 to assume the open position. While moving the valve spool 7006 towards the solenoid member 7018, the actuating member 7014 compresses the solenoid return spring 7016. Further, the solenoid member 7018 is configured to retain the open position of the valve spool 7006 even when the pressure in the gas chamber 510 drops. Such characteristics of the solenoid member 7018 to retain the open position of the valve spool 7006 even when the pressure in the gas chamber 510 drops, increases efficiency of the valve arrangement 7000 and facilitates a complete driving of the fastener 1000 into the workpiece. Further, the opening force required for configuring the open position of the valve arrangement 7000 is at least 1.5 times of the force required for maintaining the closed position of the valve arrangement 7000.

Similarly, for configuring the closed position of the valve arrangement 7000, i.e., the closed position of the valve spool 7006, the solenoid member 7018 actuates the actuating member 7014 to move towards the second cylinder 700 by means of release of potential energy stored in the solenoid return spring 7016. Accordingly, the actuating member 7014 moves the valve spool 7006 towards the second cylinder 700, and thereby blocks the opening 408 configured on the cylinder end cap 406 of the first cylinder 400.

It would be apparent to those skilled in the art that the valve arrangement 700 may be configured to assume the open position or the closed position based on the signal received from the control circuit 200. For example, during the compression stroke of the compression stroke of the operation cycle, when the first piston 500 reaches the TDC of the first cylinder 400, the first sensor 3002 detects the position of the first piston 500 and communicates the detected position of the first piston 500 to the control circuit 200. Thereafter, the control circuit 200 actuates the solenoid member 7018 of the valve arrangement 7000. The solenoid member 7018 then actuates the actuating member 7014 for configuring the open position of the valve spool 7006. Similarly, during the return stroke of the operation cycle, positioning of the first piston 500 at the predetermined position may be detected by the second sensor 3004. More specifically, the second sensor 3004 is configured to detect the predetermined position of the first piston 500 on the return stroke so as to control the timing when the valve arrangement 7000 should assume the open position. The second sensor 3004 communicates this detected position of the first piston 500 to the control circuit 200. Further, the control circuit 200 actuates the solenoid member 7018 to configure the open position of the valve arrangement 7000. Further, as the valve arrangement 7000 assumes the open position, the vacuum is utilized to retract the second piston 800 and the anvil 900 to their initial positions in the second cylinder 700.

Although in the present embodiment of the present disclosure, the valve arrangement 7000 includes the valve solenoid 7004 for configuring the open position and the closed position of the valve arrangement 7000, the present disclosure is not limited to this particular arrangement only. In another embodiment of the present disclosure may include a valve arrangement having a pneumatic valve, similar to the pneumatic valve 7002 actuated by a plurality of sensors. Such valve arrangement may be designed by considering various parameters such as pressure drop through the valve arrangement, the opening time of the valve arrangement, and the volume of gas contained in a gas passageway of the valve arrangement.

Various embodiments of the present disclosure offer following advantages. The fastener driving apparatus, such as the fastener driving apparatuses 10 10, 20 and 30, utilizing valve arrangements such as valve arrangements 2000, 6000 and 7000, respectively. Such fastener driving apparatuses, as described herein, provide retracting mechanisms that precludes consumption of drive energy of the fastener driving apparatuses and facilitates a fastener to be fully driven into a workpiece. Further, the retracting mechanisms of the fastener driving apparatuses of the present disclosure are capable of providing more safety to a user. Furthermore, the retracting mechanisms preclude reduction of drive speed of the fastener driving apparatuses. Moreover, the fastener driving apparatuses of the present disclosure are portable in nature. Further, the fastener driving apparatuses are inexpensive. Furthermore, the fastener driving apparatuses are simple in construction. Still further, the fastener driving apparatuses are capable of minimizing reactionary force and thereby providing more comfort to the user. Additionally, the fastener driving apparatus are capable of driving the fastener into the workpiece in a single stroke.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the claims of the present disclosure.

What is claimed is:

1. A fastener driving apparatus for driving a fastener into a workpiece, the fastener driving apparatus comprising:

a power source;

a control circuit electrically coupled to the power source;

a motor electrically coupled to the power source and responsive to the control circuit;

a first cylinder;

a first piston reciprocally movable within the first cylinder to execute a compression stroke and a return stroke in an operation cycle of driving the fastener into the workpiece, the first piston defining a gas chamber within the first cylinder, the gas chamber capable of accommodating gas therein;

a linear motion converter driven by the motor and operationally coupled to the first piston for reciprocally moving the first piston within the first cylinder;

a second cylinder pneumatically connected to the first cylinder;

a second piston reciprocally movable within the second cylinder;

an anvil coupled to the second piston, the anvil capable of striking the fastener to drive the fastener into the workpiece;

a valve arrangement operationally disposed between the first cylinder and the second cylinder for pneumatically connecting the first cylinder and the second cylinder, the valve arrangement configured to define a gas passageway between the first cylinder and the second cylinder in an open position and blocking the gas passageway in a closed position; and at least one sensor electrically coupled to the control circuit, the at least one sensor configured to detect at least one position of the operation cycle and communicate the detected position of the operation cycle to the control circuit, wherein during the compression stroke, the first piston is configured to move towards a top dead center of the first cylinder for compressing the gas in the gas chamber, the valve arrangement assuming the open position for communicating the compressed gas to the second cylinder causing the second piston to move linearly and enabling the anvil to drive the fastener into the workpiece; and wherein during the return stroke the valve arrangement assumes the closed position and the first piston is configured to move towards a bottom dead center of the first cylinder thereby creating a vacuum in the first cylinder between the top dead center of the first cylinder and the first piston; and wherein at a predetermined position of the first piston during the return stroke the valve arrangement assumes the open position, thereby communicating the vacuum created in the first cylinder to the second cylinder and causing the second piston and the anvil to retract to initial positions of the second piston and the anvil; and wherein during the return stroke, based on the at least one detected position by the at least one sensor, the control circuit is configured to disconnect the power source from the motor to stop the operation cycle.

2. The fastener driving apparatus of claim 1, wherein the power source is a rechargeable battery.

3. The fastener driving apparatus of claim 1, wherein the linear motion converter comprises a crankshaft mechanism.

4. The fastener driving apparatus of claim 1, wherein in the open position of the valve arrangement, a compression valve has a flow coefficient greater than one.

5. The fastener driving apparatus of claim 1, wherein during the compression stroke of the first piston the gas in the gas chamber is compressed to the predetermined pressure at a compression exponent greater than 1.05.

6. The fastener driving apparatus of claim 1, wherein the valve arrangement comprises a valve solenoid.

7. The fastener driving apparatus of claim 1, wherein a valve is adapted to allow atmospheric air to flow into the gas chamber after the vacuum has been communicated to from the first cylinder to the second cylinder.

8. The fastener driving apparatus of claim 7 further comprising an actuation member disposed on a body portion of the fastener driving apparatus for actuating the valve to allow the atmospheric air to flow into the gas chamber.

9. The fastener driving apparatus of claim 1, wherein volume of the gas passageway is less than about 15% of volume of the first cylinder.

10. The fastener driving apparatus of claim 1, further comprising a coupling member coupled between the motor and the valve arrangement, the coupling member actuated by the rotation of the motor for actuating the valve arrangement to:

assume the open position for communicating the compressed gas to the second cylinder during the compression stroke;

assume the closed position for creating a vacuum in the first cylinder between the top dead center of the first cylinder and the first piston during the return stroke; and assume the open position for communicating the vacuum from the first cylinder to the second cylinder during the return stroke.

11. The fastener driving apparatus of claim 1, wherein the control circuit is further configured to actuate the valve arrangement to assume the closed position after the vacuum created in the first cylinder is communicated to the second cylinder.

12. The fastener driving apparatus of claim 1, wherein the valve arrangement comprises a pneumatic valve and a valve solenoid for actuating the pneumatic valve, the valve solenoid controlled by the control circuit.

13. The fastener driving apparatus of claim 1, wherein the valve arrangement comprises a vent opening for releasing gas from the second cylinder to atmosphere in the closed position of valve arrangement.

*14. A fastener driving apparatus for driving a fastener into a workpiece, the fastener driving apparatus comprising:*

*a power source;*

*a control circuit electrically coupled to the power source;*

*a motor electrically coupled to the power source and responsive to the control circuit;*

*a first cylinder;*

*a first piston reciprocally movable within the first cylinder to execute a compression stroke and a return stroke in an operation cycle of driving the fastener into the workpiece, the first piston defining a gas chamber within the first cylinder, the gas chamber capable of accommodating gas therein;*

*a linear motion converter driven by the motor and operationally coupled to the first piston for reciprocally moving the first piston within the first cylinder;*

*a second cylinder pneumatically connected to the first cylinder;*

*a second piston reciprocally movable within the second cylinder;*

*an anvil coupled to the second piston, the anvil capable of striking the fastener to drive the fastener into the workpiece;*

*a valve arrangement operationally disposed between the first cylinder and the second cylinder for pneumatically connecting the first cylinder and the second cylinder, the valve arrangement configured to define a gas passageway between the first cylinder and the second cylinder in an open position and blocking the gas passageway in a closed position; and*

*at least one sensor electrically coupled to the control circuit, the at least one sensor configured to detect at least one position of the operation cycle and communicate the detected position of the operation cycle to the control circuit,*

*wherein during the compression stroke, the first piston is configured to move towards a top dead center of the first cylinder for compressing the gas in the gas chamber, the valve arrangement assuming the open position for communicating the compressed gas to the second cylinder causing the second piston to move linearly from a first position to a second position and enabling the anvil to move from a first position to a second position to drive the fastener into the workpiece; and*

*wherein during the return stroke the first piston is configured to move towards a bottom dead center of the first cylinder, thereby creating a vacuum in the gas chamber at the top of the first cylinder,*

*wherein said valve arrangement assumes an open position during at least a portion of the return stroke of the first piston, thereby communicating said vacuum through said valve arrangement to the second cylinder, which vacuum causes the second piston to move linearly from said second position to said first position and the anvil to move from said second position to said first position;*

*and wherein during the return stroke, based on the at least one detected position by the at least one sensor, the control circuit is configured to disconnect the power source from the motor to stop the operation cycle.*

*15. The fastener driving apparatus of claim 1, wherein the second cylinder further comprises a magnet disposed on a top plate thereof, and the anvil comprises a ferrous material.*

*16. The fastener driving apparatus of claim 14, wherein the second cylinder further comprises a magnet disposed on a top plate thereof, and the anvil comprises a ferrous material.*

*17. A fastener driving apparatus for driving a fastener into a workpiece, the fastener driving apparatus comprising:*

*a power source;*

*a control circuit electrically coupled to the power source;*

*a motor electrically coupled to the power source and responsive to the control circuit;*

*a first cylinder;*

*a first piston reciprocally movable within the first cylinder to execute a compression stroke and a return stroke in an operation cycle of driving the fastener into the workpiece, the first piston defining a gas chamber within the first cylinder, the gas chamber capable of accommodating gas therein;*

*a linear motion converter driven by the motor and operationally coupled to the first piston for reciprocally moving the first piston within the first cylinder;*

*a second cylinder pneumatically connected to the first cylinder;*

*a second piston reciprocally movable within the second cylinder;*

*an anvil coupled to the second piston, the anvil capable of striking the fastener to drive the fastener into the workpiece;*

*a valve arrangement operationally disposed between the first cylinder and the second cylinder for pneumatically connecting the first cylinder and the second cylinder, the valve arrangement configured to define a gas passageway between the first cylinder and the second cylinder in an open position and blocking the gas passageway in a closed position; and*

*at least one sensor electrically coupled to the control circuit, the at least one sensor configured to detect at least one position of the operation cycle and communicate the detected position of the operation cycle to the control circuit,*

*wherein during the compression stroke, the first piston is configured to move towards a top dead center of the first cylinder for compressing the gas in the gas chamber, the valve arrangement assuming the open position for communicating the compressed gas to the second cylinder causing the second piston to move linearly from a first position to a second position and enabling the anvil to move from a first position to a second position to drive the fastener into the workpiece; and*

*wherein during the return stroke the first piston is configured to move towards a bottom dead center of the first cylinder, thereby creating a vacuum in the gas chamber at the top of the first cylinder,*

*wherein said valve arrangement assumes an open position during at least a portion of the return stroke of the first piston, thereby communicating said vacuum through said valve arrangement to the second cylinder, which vacuum causes the second piston to move linearly from said second position to said first position and the anvil to move from said second position to said first position; and*

*wherein based on the at least one detected position by the at least one sensor, the control circuit is configured to stop the operation cycle.*

* * * * *